Oct. 1, 1963 W. VAN DIJK ETAL 3,105,724
LUBRICATING SYSTEM FOR BEARINGS
Filed June 3, 1960

INVENTOR
WIEGER VAN DIJK
EVERHARDUS C. ETTEMA
BY
AGENT

United States Patent Office 3,105,724
Patented Oct. 1, 1963

3,105,724
LUBRICATING SYSTEM FOR BEARINGS
Wieger Van Dijk and Everhardus Catharinus Ettema, Drachten, Netherlands, assignors to North American Philips Company, Inc., New York, N.Y., a corporation of Delaware
Filed June 3, 1960, Ser. No. 33,784
Claims priority, application Netherlands June 6, 1959
3 Claims. (Cl. 308—36.4)

The invention relates to a lubricating system for an electric motor, particularly useful in dry shaving apparatus, comprising a flat collector and associated brushes and a bearing plate opposite the collector with an associated oil-absorbing material, for example felt, for lubricating the bearing. The invention is characterized in that the bearing plate is provided, with a chamber surrounding the motor shaft located between a bearing member and the collector plate and one or more ducts communicating between the oil absorbing material and the said chamber.

This has the advantage that oil is centrifuged from the rapidly rotating motor shaft, collected in the chamber and carried back to the felt via one or more ducts. The felt or the like should not be saturated with oil, so that it can operate as a sponge.

As a rule it is advisable for the ducts to have a capillary effect so that the transport to the felt is improved.

Owing to the measures described above practically no lubricant is lost and, moreover, the lubricant does not travel along the motor shaft to the brushes and/or the collector. Thus, the disadvantage that the brushes become jammed in their holders which increases the transition resistance between the brushes and collector owing to the combined effect of oil and worn-off brush particles, is avoided for the most part if not substantially completely avoided.

Figure 1:
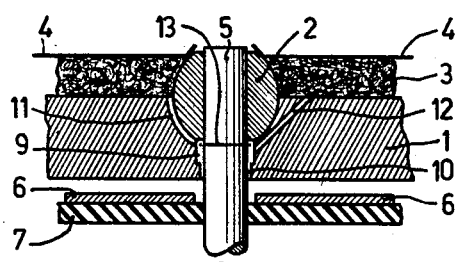
Figure 2:
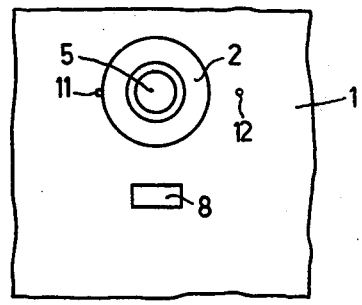

One embodiment of the invention is shown diagrammatically in the accompanying figures, of which FIG. 1 is a partial cross sectional view of part of the bearing plate adjacent the motor shaft and the collector and FIG. 2 is a partial plan view of the bearing plate.

As shown in FIG. 1, the bearing plate 1 is provided with a cup-shaped cavity, in which is arranged a ball-shaped bearing member 2, which is lubricated with the aid of oil containing felt 3. A blade spring 4 held in place in any suitable manner serves to secure the bearing 2 in the bearing plate.

On the shaft 5 adjacent the bearing plate a flat collector or commutator, is provided, the laminations 6 of which are secured to a disc 7 of insulating material. In the plan view of FIG. 2, in which the blade spring 4 and the felt 3 are omitted, the opening for one of the brushes contacting the commutator is designated by 8.

An annular chamber 9 is provided in the bearing plate 1 (see FIG. 1) around the shaft 5, as shown. Between chamber 9 and the felt 3 are one or preferably at least two ducts 11 which conduct the oil therebetween. A flange 10 is also provided as shown on the collector side of the bearing plate. The ducts may have the form designated by 12.

When using more than one duct, these ducts are arranged around the bearing.

The shaft 5 is provided with a flange or oil slinger means 13 to improve the centrifuging of the oil.

What is claimed is:

1. An improved lubricating system for a small electric motor such as utilized in electric shaver apparatus comprising a motor bearing plate, a bearing recess extending inwardly from one side of said plate and a motor shaft bore in said plate connected with said recess, a motor shaft and associated bearing member operatively associated with said bearing plate, lubricating-oil-absorbing material supported on said plate and operatively associated with said recess and bearing member, resilient means overlying said material and bearing on said bearing member to contain said material and hold said member in said recess, a chamber in said plate connected with said recess and concentric with said bore, at least one capillary duct interconnecting said chamber with the surface of said plate supporting said material at a point closely adjacent said bearing member, and an oil slinger means on said shaft extending into said chamber whereby oil centrifugally flung from said shaft is collected in said chamber and conducted to said material.

2. In a lubricating system for small electric motors such as utilized in electric shavers in which a lubricating-oil-absorbing material is associated with the bearing member connected with the motor shaft, the combination with said material and bearing member comprising a bearing plate having a bearing recess extending inwardly from one surface of said plate and a motor shaft bore connected with said recess and extending through said plate, an annular undercut in said plate defining a chamber concentric with said bore in communication with said recess, and flange means between said chamber and the surface of said plate opposite said one surface, and at least one duct means in said body extending between said chamber and said one surface of said plate at a point closely adjacent said bearing recess whereby oil is transferred to the portion of said material closely adjacent said bearing member.

3. A bearing plate according to claim 2 wherein said duct means transfers said oil by capillary action.

References Cited in the file of this patent
UNITED STATES PATENTS

| 2,171,390 | Bode et al. | Aug. 29, 1939 |
| 2,519,948 | Willits | Aug. 22, 1950 |
| 2,602,712 | Johnston | July 8, 1952 |
| 2,850,335 | Thompson et al. | Sept. 2, 1958 |